United States Patent [19]
Hulan et al.

[11] Patent Number: 5,987,270
[45] Date of Patent: Nov. 16, 1999

[54] DIGITAL COPYING MACHINE THAT AUTOMASKS DATA FOR SMALL ORIGINALS IF A DOCUMENT FEEDER IS PRESENT

[75] Inventors: Gregory T. Hulan; Gary W. Gragg, both of San Diego; A. Justine Worley, Murrieta, all of Calif.

[73] Assignee: Hewlett-Packard Company, Palo Alto, Calif.

[21] Appl. No.: 08/982,185

[22] Filed: Dec. 17, 1997

[51] Int. Cl.⁶ .................................................. G03G 21/00
[52] U.S. Cl. .............................. 399/45; 399/370; 399/376
[58] Field of Search ............................. 399/45, 370, 371, 399/376

[56] References Cited

U.S. PATENT DOCUMENTS 4,618,138 10/1986 Silverberg .
4,791,451 12/1988 Hirose et al. .
4,990,956 2/1991 Iwata .

*Primary Examiner*—Richard Moses
*Attorney, Agent, or Firm*—Jerry R. Potts

[57] ABSTRACT

Images of certain features of the copier itself (indicia, markings, operational components) are searched for, in a defined field of view used for copying. Any such images found, because they are not covered by a document being copied, are suppressed. This avoids the objectionable appearance of machine features from copies on full-size sheets of print medium, and deposition of ink on mechanisms of the copier itself. Preferably things in the field of view are imaged, and the image is parsed for the certain features—readily done by a software or firmware module or ASIC stage, easily incorporated into already-existing software, firmware or circuitry at minor unit cost. Preferably the copier features include document-size indicia, to aid determination by the copier whether a standard-size document is being copied, and thus whether suppression is in order. The search could be for operational machine features rather than special indicia, but those features may not be ideally positioned. Suppression may be of all machine features if the "certain" features are found. Preferably copying of shadows at edges of a document is also suppressed—an easy function to add to the primary operation described. In finding of document edges, it is desirable to ignore all machine features. Preferably photosensors acquire image data from a document, and a print stage prints an image using the data. A feeder, if in operation, positions a document at the sensors. If the feeder is attached to the copier but not in service, data are analyzed automatically to find whether the document is below a particular standard size; and, if so, in response printing of data portions is suppressed automatically.

22 Claims, 5 Drawing Sheets

DIGITAL COPYING MACHINE THAT AUTOMASKS DATA FOR SMALL ORIGINALS IF A DOCUMENT FEEDER IS PRESENT

RELATED PATENT DOCUMENTS

Related to the present invention are the disclosures of two coowned and copending documents in the name of James Amidei: U.S. patent application Ser. No. 08/946,676, filed Oct. 8, 1997, and entitled "IMAGE BOUNDARY DETECTION FOR A SCANNED IMAGE"; and U.S. patent application Ser. No. 08/876,071, filed Jun. 13, 1997, and entitled "MARGIN SEEKING FOR MULTIPLE COPY JOBS". Both are incorporated in their entirety into the present document.

FIELD OF THE INVENTION

This invention relates generally to machines and procedures for copying document images onto printing media such as paper, transparency stock, or other glossy media; and more particularly to a digital scanning machine and method that acquire digital image data for each document, and then apply those data to print an image as individual ink spots created on a printing medium, in a two-dimensional pixel array.

BACKGROUND OF THE INVENTION

An automatic document feeder is an extremely useful adjunct to a flatbed copying machine, but often original documents are placed manually on the copy glass even though the automatic feeder is present. This mode of use, familiar to operators of such machines, is particularly useful for small documents such as snapshot photographs, receipts, checks, notes and so on.

In some such cases the copy may be made onto a small piece of printing medium, such as for example a piece of photo-quality glossy paper that matches the size of a snapshot being copied—for example, about 10 by 15 cm (4 by 6 inches). Alternatively, the copy may be made onto a full-size piece of printing medium, whose excess area is later either trimmed away or ignored.

When original documents are placed on a copy glass manually—either because the documents are small or for other reasons (such as reluctance to feed a valuable document through an automatic feeder)—the feeder is typically hinged up out of the way, for access to the copy glass during placement of the original on the glass. The feeder is then lowered again before copying begins. Thus the feeder is not used as a feeder, i.e. it is not really in service, and at most acts as a backup panel in lieu of a lightweight cover.

Typically portions of an automatic document feeder apparatus are visible to the scanning stage of a copier when a small document is in place on the glass. These portions most commonly include document-moving rollers, and so-called "roll-off" areas (which will be introduced below); and may also include document-moving belts and the like. Such visible apparatus portions give rise to image data, and the overall image data array includes these data together with the desired image data for the document.

Naturally the images of the apparatus portions are then copied, along with the desired document image, onto the printing medium—if the printing medium is large enough to intercept the ink generated by the apparatus-portion component of the data. Such images of the apparatus portions would be objectionable to most or many final users of the copies.

If the printing medium is not large enough to catch this spurious inking, then the ink is instead applied to some portion of the printing-stage mechanism in the copier—thereby soiling the mechanism. In time, such misapplied ink usually causes some sort of trouble, depending on the type of mechanism in use.

For example, in one inkjet-type copier with which we are familiar the ink accumulates on a part of the mechanism known as the "print pivot", and is later transfered to subsequent copies. The resulting spoiled, ink-streaked copies would be objectionable to almost all final users.

If not cleaned away, in time the ink may actually come to interfere with mechanical operation of the mechanism itself. Analogous visual and mechanical problems may be expected with other kinds of copiers to which our invention may be applicable, such as for instance thermal-transfer or dot-matrix types.

Another somewhat related problem in copiers is the appearance of shadows around the edges of output images, particularly edges that are not fully pressed down against the copy glass. Depending on the geometry of the backup panel, such shadows may appear along edges of the document image that correspond to edges of the original document which are positioned near the outer envelope of the copying machine; or in other cases may appear even along edges of the image that nearer the center of the apparatus. In any event these shadows are usually considered unaesthetic and undesirable.

We are aware of one scanner/copier, available from the Canon Corporation, that has a so-called "image replicate" operating mode. This mode, when specifically invoked by an operator, scans an undersize document, automatically selects framing for the document, and then prints as many images of the document as possible onto a single page of printing medium. For instance a thumbnail photo about 2 by 4 cm (roughly 1½ by 2½ inches) may yield twenty actual-size copies on A4 paper.

Since this system relies upon operator commands to initiate its "replicate" mode, and is not particularly addressed to the context of out-of-service document feeders, it fails to solve the problems described above.

A scanner of the Hewlett Packard Company, available under the model designation "ScanJet 5p" is able to automatically find correct framing for an undersize document. That system, however, is not a copier—and furthermore stops, after selecting tentative framing, to wait for an operator's confirmation or adjustment of that framing. Therefore the ScanJet 5p does not resolve the problems under discussion.

Therefore quality defects as described above remain, impeding the achievement of uniformly excellent printing by inkjet copiers, and some other types of copiers as mentioned earlier. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is apparatus for copying a document. The apparatus includes some means for copying things that are within a defined field of view. For purposes of generality and breadth in discussion of our invention, we shall refer to these means as simply the "copying means".

In addition the apparatus includes visible apparatus features within the field of view. By "apparatus features" we mean to encompass indicia or markings as well as operational components and any other element of the apparatus that is visible to the copying means.

Also included in the apparatus are some means for suppressing copying of the visible apparatus features if they are not covered by such document. Again for breadth and generality we shall refer to these means as the "suppressing means". The suppressing means are automatic.

The foregoing may constitute a description or definition of the first facet of the invention in its broadest or most general form. Even in this general form, however, it can be seen that this aspect of the invention significantly mitigates the difficulties left unresolved in the art.

In particular, by suppression of the copying of apparatus features, the invention eliminates the previously mentioned objectionable appearance of apparatus features in copies made on full-size sheets of printing medium. It also eliminates the objectionable deposition of ink on mechanisms of the copier itself, with the resulting problems discussed above.

Although this aspect of the invention in its broad form thus represents a significant advance in the art, it is preferably practiced in conjunction with certain other features or characteristics that further enhance enjoyment of overall benefits.

For example, it is preferred that the copying means include some means for acquiring an image of things within the field of view, and the suppressing means include some means for searching the image for certain of the visible apparatus features. These "acquiring means" and "searching means" provide a particularly efficient and economical way of implementing the basic invention.

The reason is that searching of an acquired image is readily implemented by a software module, firmware module, or application-specific circuitry stage—which can be straightforwardly incorporated into already-existing software, firmware or circuitry. Virtually negligible additional per-unit cost is involved in thus extending the capabilities of a copier.

Another preference is that certain of the apparatus features include document-size indicia (i.e., markings which indicate whether a document size is greater or smaller than needed to extend past the position of the markings) carried on the apparatus. Such features facilitate determination by the copier apparatus itself whether a full-size or some standard size of document is being copied, and therefore whether any image suppression is in order.

It will be understood that indicia may not be strictly necessary, since the system may instead search for operational apparatus features rather than specially provided indicia. In general, however, the operational features may not be positioned ideally for determining with specificity or precision the size of a sheet of printing medium that is present.

Yet another preference is that the suppressing means further include some means for suppressing copying of all the visible apparatus features if the "certain" features are found. Thus for instance if indicia are found, or if one roller is found, the system can proceed to suppress not only the indicia, or not only a single roller, but also all rollers and other operating equipment or indicia in the field of view.

We prefer that the suppressing means also include some means for preventing copying of shadow images formed at the edges of a document image. Such shadow images, although perhaps relatively difficult to eliminate in copiers considered generally, are quite straightforward to eliminate—at least in the great majority of copying situations—in the context of an apparatus that already has the first independent aspect or facet of our present invention.

Once the system has been given the ability to evaluate image data for original-document sizes, and the ability to suppress unwanted data outside the document size as evaluated, the further ability to suppress shadows is very easy to add. Preferably the shadow-image-preventing means include some means for finding document-image edges, and some means for copying material sufficiently within the document-image edges to avoid copying shadow images.

We furthermore particularly prefer that the previously mentioned means for finding document-image edges include some means for ignoring all visible apparatus features within the field of view. We believe that this particular preference is especially counterintuitive, since earlier-mentioned portions of the image-analyzing system in fact require searching for, and recognizing, visible apparatus features; as will be understood, however, in our invention the edge-finding stage employs the opposite stratagem.

In preferred embodiments of a second of its facets or aspects, our invention is a machine for copying a document. The machine includes photosensors for acquiring image data from such document, and some means for printing an image based on the data.

The machine also includes a document feeder for positioning such a document at the photosensors, and some means for automatically analyzing the data to determine whether the document is smaller than a standard size. (Of course more than one "standard" size of document, and of printing medium, exists. The machine accordingly is programmed to proceed on the basis of some particular standard size that is most appropriate to other elements of the apparatus design.)

Also included in the machine are some means, responsive to the analyzing means, for automatically controlling the printing means to suppress printing of portions of the data. The analyzing and controlling means operate whenever the document feeder is attached to the copying machine but not in service.

This last statement means only that when the feeder is not being used the controlling means always stand ready to suppress certain data portions if so indicated by the analyzing means. In other words it is to be understood that the controlling means do not actually perform such suppression unless the analyzing means so dictate.

Also the concept of "not in service" or "not being used" shall be interpreted in a realistic, practical way. Even though the document feeder may be holding a document down against a copy glass—and may also be backstopping the document in lieu of a common, passive backup panel, so that the copying light is reflected back into the sensor from regions to which a document does not extend—the feeder is not to be considered "in service" or "being used" if the operator is manually placing documents on the glass. In short, for purposes of the appended claims and this text a feeder is only "in service" or "being used" if it is turned on and being used to feed documents.

The foregoing may constitute a description or definition of the second facet of the invention in its broadest or most general form. Even in this general form, however, it can be seen that this aspect of the invention too significantly mitigates the difficulties not heretofore resolved in the art.

In particular, this second aspect of the invention enables an apparatus to automatically deal with undersize original documents and the resulting problems that they can cause— in context with an automatic feeder that is present but not in use.

Although this second aspect of the invention in its broad form thus represents a significant advance in the art, it is preferably practiced in conjunction with certain other features or characteristics that further enhance enjoyment of overall benefits.

For example, it is preferred that the document feeder carry document-size indicia; and the analyzing means include means for comparing portions of the data with the document-size indicia. We also prefer that the controlling means suppress printing visible features of the document feeder, including but not limited to the document-size indicia, if the comparing means find data corresponding to the document-size indicia. Other preferences include those mentioned above for the first main facet of the invention.

In a preferred embodiments of a third of its basic aspects or facets, the invention is a method of copying a document, using a copying machine that has a document feeder in operating position but not in service. The method includes the steps of automatically acquiring image data with the document in copying position, and automatically analyzing the data to determine whether the document is smaller than a standard size.

Another step is, responsive to the analyzing step, automatically suppressing portions of the data whenever the document feeder is substantially in operating position but not in service, if the analyzing step indicates that the document is smaller than a standard size. Yet another step is automatically printing unsuppressed portions of the data.

The foregoing may represent a definition or description of the third facet of the invention in its most broad or general form. Even as so couched, however, this aspect of the invention has important benefits that will be recognized as related to those of the second apparatus aspect of the invention, discussed above.

Yet this method facet of the invention is preferably practiced in conjunction with certain characteristics or features that optimize its performance. We prefer that the acquiring step include operating a scanner portion of the copying machine to acquire specific image data of a part of the document feeder that has indicia.

The indicia are for distinguishing between presence and absence of at least one standard size of printing medium. We also prefer that the analyzing step include searching the specific image data for an image of the indicia.

It will shortly become plain that certain aspects of our invention could be practiced without indicia, and without a search for data corresponding to the indicia image, by installing a separate printing-medium-width sensor and directly reading the effective width of the printing medium from that sensor. The additional sensor hardware, however, would add significant cost to the overall apparatus.

In addition preferably if the analyzing step indicates that the document is smaller than a standard size, then the method includes automatically acquiring further image data with the document still in copying position, and automatically analyzing the further image data to find edges of the document. Preferably the further-data analyzing step includes ignoring data corresponding to the image of the indicia—and still more preferably, ignoring data corresponding to images of known apparatus features (by this we particularly mean to refer to operational features) of the document feeder.

Furthermore the acquiring step preferably includes operating a scanner portion of the copying machine to acquire specific image data corresponding to a part of the document feeder that appears dark if not concealed, to distinguish between presence and absence of at least one standard size of printing medium. Such a part is not necessarily a marking, or a dark-colored component, but rather may be simply a region that is not effectively illuminated or a surface that is relatively far (from the photosensitive elements of the copier) behind the copy glass. In this case the analyzing step preferably includes determining the brightness represented by the specific image data.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

A preferred embodiment of a copier 1 (FIG. 1) according to our invention include a copy glass 2, a document feeder 3 with an original-document input tray 4, a supply tray 5 for blank paper or other printing medium, and an output tray 6 for finished copies. The copier has a control cluster 7.

Figure 4:
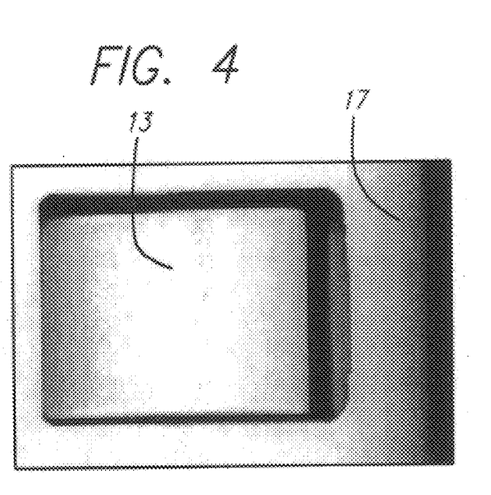
FIG. 4 is a like image of one of the document-feeding rollers in the FIG. 2 feeder.

The document feeder 3 includes a hold-down panel 11 with a white backing surface 12. Document-advance rollers 13 (see also FIGS. 2 and 4) are mounted for rotation in recesses near the entry edge of the hold-down panel 11.

A word about orientation may be very helpful at this point. Mechanical engineers tend to think about directions from the perspective of the copying glass 2 and other parts of the hardware, as seen from a vantage in front of the machine or above it, or both—whereas programmers and others particularly interested in bitmaps and the like tend to think about directions from the perspective of a document 10, as seen from the front of the document.

Figure 1:
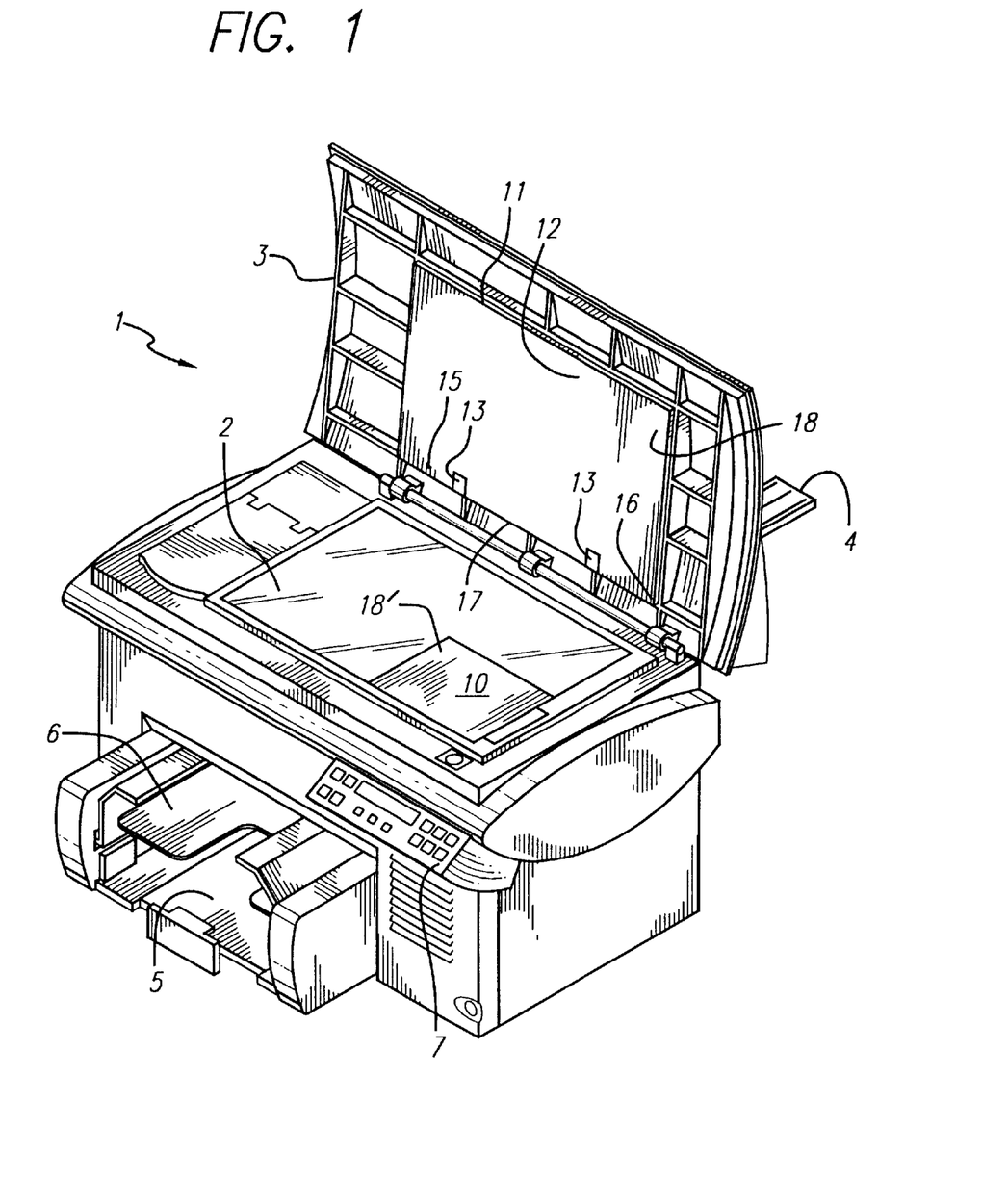
FIG. 1 is an isometric drawing of a copier incorporating a preferred embodiment of our invention.

As suggested in FIG. 1, the long dimension (top to bottom) of a document ordinarily is oriented from left to right on the glass, as viewed by a person standing in front of the machine, so that the "right edge" of the glass corresponds to the "top" of the document. Furthermore when the document is on the copy glass 2, a photosensors 21 under the glass must be able to see the face or front of the document— which accordingly is below the document. Thus what we may call the upper left corner of the document is positioned at the forward right corner 18' of the copy glass 2; the lower right corner of the document is closer to the rear left corner of the glass, and so forth.

Figure 2:
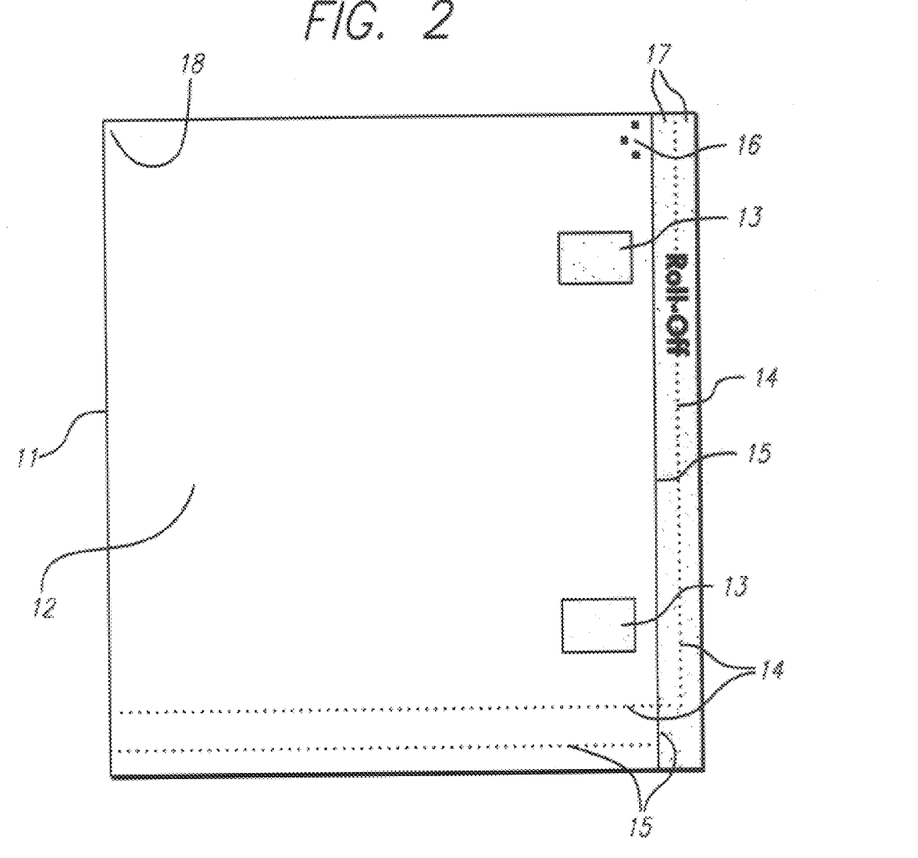
FIG. 2 is a diagram of the underside of an automatic
Figure 3:
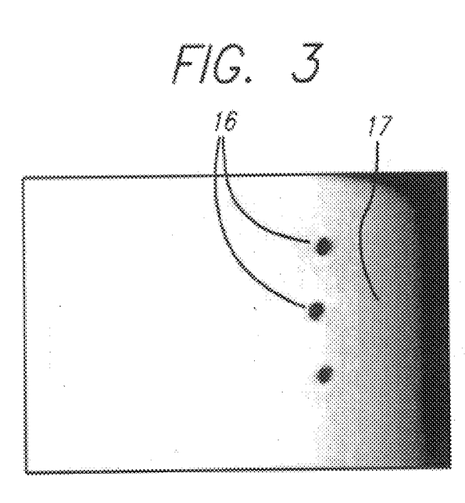
FIG. 3 is a scanned image of a segment of the FIG. 2 feeder panel that we call the "roll-off" area, particularly showing indica or so-called "tick marks"

The copying positions for A-size (8½ by 11 inch) and A4-size (roughly 8½ by 11.7 inch) printing medium are marked in FIG. 2 for reference at 14 and 15 repectively. Tick marks 16 (see also FIGS. 2 and 3) are formed further toward the rear of the machine than the rollers 13 (but also further toward the right side of the machine), just adjacent to the roll-off area 17—an important surface that curves smoothly up and away from the plane of the remainder of the hold-down panel 11.

This construction is particularly important when the automatic feeder is in operation, helping to guide document edges under the panel 11, from rear to front in FIG. 1 (right to left in FIGS. 2 and 5) and thus into the space between the panel 11 and the glass 2. As will be seen, however, the roll-off 17 introduces complications when originals are to be positioned on the glass by hand.

To copy a document manually, the operator places it face down in the forward right corner 18' of the copy glass 2. A small document 10, for example, thus covers only a small portion of the glass 2—leaving the rollers 13 and roll-off area 17 visible to the photosensors 21 (FIG. 5) below the glass.

Full-size documents too may be manually positioned on the glass, and an important part of our invention is distinguishing between small and large originals. While it is important, for all the reasons previously presented, to suppress copying in the area of the rollers, roll-off etc. when copying small documents, it is also important to not suppress copying of image portions in the same area when copying large documents.

Operation of our invention is initiated by an operator's "copy" command in the cluster 7—i.e., actuation of a control button instructing the machine to make a copy of an original document 10 that has been manually placed on the copy glass 2. With our invention, unlike systems heretofore as described earlier, the operator need not actuate any mode-control device, or enter any masking command using any masking-control device.

Indeed the copier has no such mode- or masking-control device in the cluster 7 or elsewhere. Instead the system automatically invokes the novel operations of our invention in response to a "copy" command whenever the feeder tray 4 contains no original document.

Figure 5:
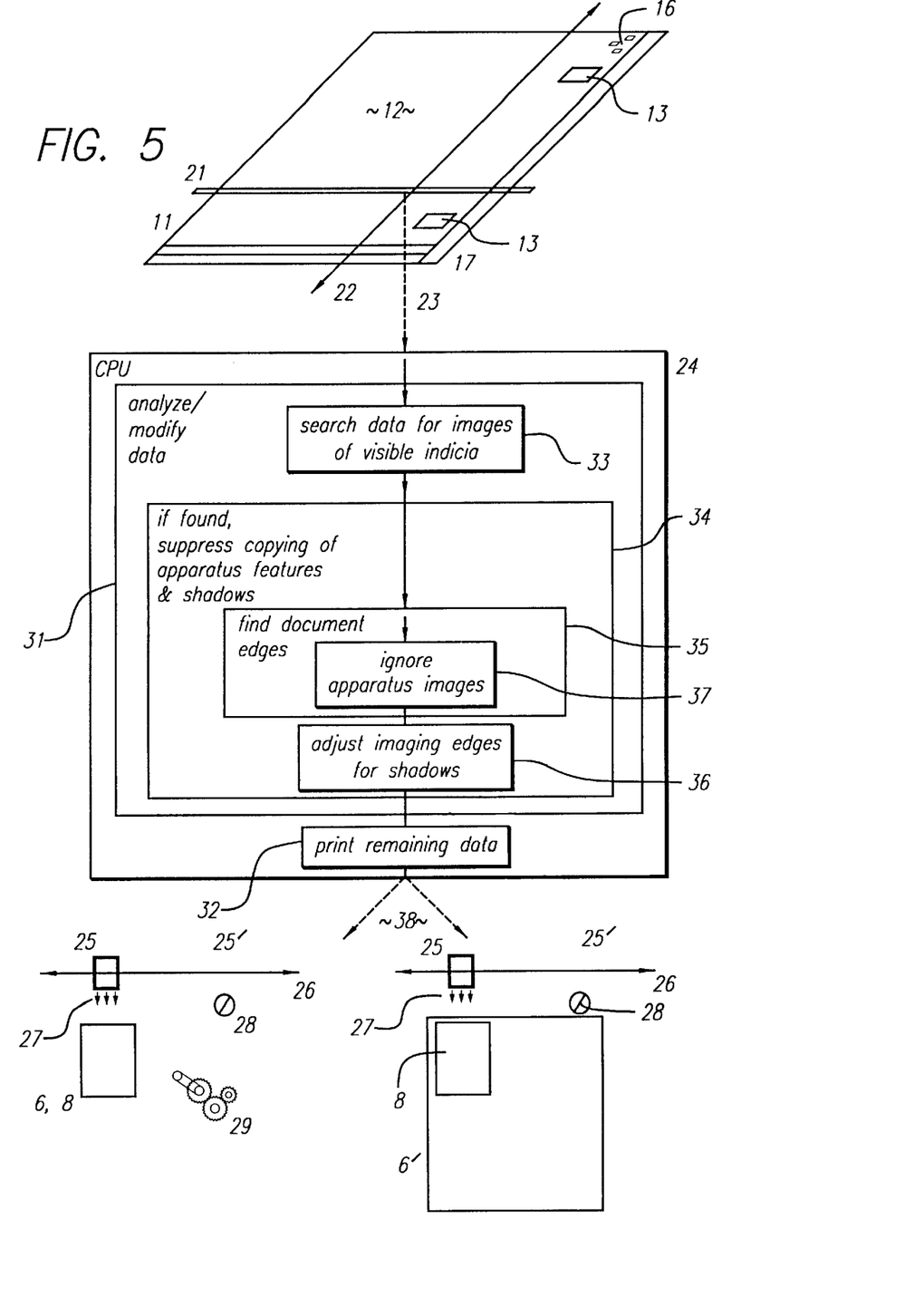
FIG. 5 is a conceptual block diagram of a preferred embodiment of the invention.

The photosensitive elements 21 below the copy glass 2 are linear sensor arrays which in operation scan 22 at right angles to the direction of paper movement. Data 23 from the sensors is directed to a digital central processor unit (CPU) 24, which formats and prepares the image data for printout 38 by printheads 25, preferably thermalinkjet printheads—but also possibly transfer printheads and other types as mentioned above.

The system may be for black-and-white copying only, or may include capabilities for three-color scanning and four-color printing, generally as is well known in the field of digital printers, scanners and copiers. Of course such processing includes color corrections if necessary or desired, and includes rendition procedures to enable a relatively small number of colors or color levels to approximate on an overall scale the many tens of thousands of colors that may be represented in input image data.

The processing also includes rearranging and timing the output data for control of printheads 25, during scanning 26 back and forth across the printing medium, to eject inkdrops 27 at precisely the right moments to form the desired output image on a row-and-column pixel basis. These processes can be carried out by firmware in a read-only memory (ROM) or in a specialized application-specific integrated circuit (ASIC), or in combinations of these.

Alternatively if the copier functions are intimately associated with a computer, some or all of the processing can be handled by software operating in the computer. For purposes of simplicity in discussion we shall simply refer to these various options generally as "programming", "the program", "program modules" and so forth—all of which will be understood to be programming embodied in memory devices and therefore actually hardware. Since all these matters are largely common knowledge and not at the heart of the invention, it is to be understood that the symbols 21, 25 in FIG. 5 may represent multicolor capabilities, if the copier is a color system.

Within the CPU 24, in addition to the processes mentioned in the preceding paragraph, a very small number of additional program modules 31–37 (FIG. 5) effectuates the present invention. These include two main modules that respectively perform data analysis/modification 31, and emit commands 32 for printing of the modified data regions. The latter commands 32 result in a final scan (not shown) of the document area now fully defined, and then data flow 38 from that scan applied to control printing 27 by the printheads 25.

Now at a closer look the primary program module 31 may be conceptualized as in turn incorporating two main submodules: one that performs a data search 33 for images of visible indicia, and a second that performs suppression 34 of those indicia, and also of other apparatus features—and furthermore of shadows as previously mentioned.

In some parts of the following discussion we use the term "shadows" somewhat loosely to encompass images of apparatus features, e.g. rollers, as well as actual shadows arising from the relative positions of the sensor array 21 and its accompanying light source (not illustrated). This usage will be clear from the context, to those skilled in the art. (Our objectives particularly include trimming away data that correspond to actual shadows at the bottom of a document image, and images of rollers and the like near the right side of the document image.)

The first of the two above-mentioned submodules, the search module 33, is yet further recognized as performing two additional tasks—finding 35 of document edges, and adjusting 36 the imaging edges for possible or probable shadows. One still further nested function, previously mentioned, that is worthy of notice here is the ignoring 37 of apparatus images in the course of the edge-finding function 35.

The printheads—when scanning across their positions 25 where the document image 8 should be—do print the document image 8 either on a small piece 6 or large piece 6' of printing medium. As a result of the tasks performed in program modules 31 and 32, however, when the printheads scan through positions 25' where no image should be printed, all output inking is subject to suppression 28: no ink is ejected onto the mechanism 29 when the small piece 6 of print medium is in use, or onto aesthetically inappropriate portions of the large sheet 6' of printing medium when a large sheet is in use.

Turning to a more literal representation of the programming, operation of our invention is initiated automatically by a "copy" command 41 (FIG. 6) when the automatic document feeder (ADF) is present and operational but not in use—i.e., when no document is present in the feeder tray 4. The illustrated procedures are active only if the ADF is attached but the operator places the original on the glass manually.

(As suggested earlier, certain particular aspects of our invention are applicable to belt-driven document feeders, which are capable of feeding small documents into position on the copying glass. In such a case the automasking features of our invention should advantageously be employed when the feeder is in service, as well as when it is not in service—and preferably without any operator control, at least for almost all operating conditions.)

Figure 6:
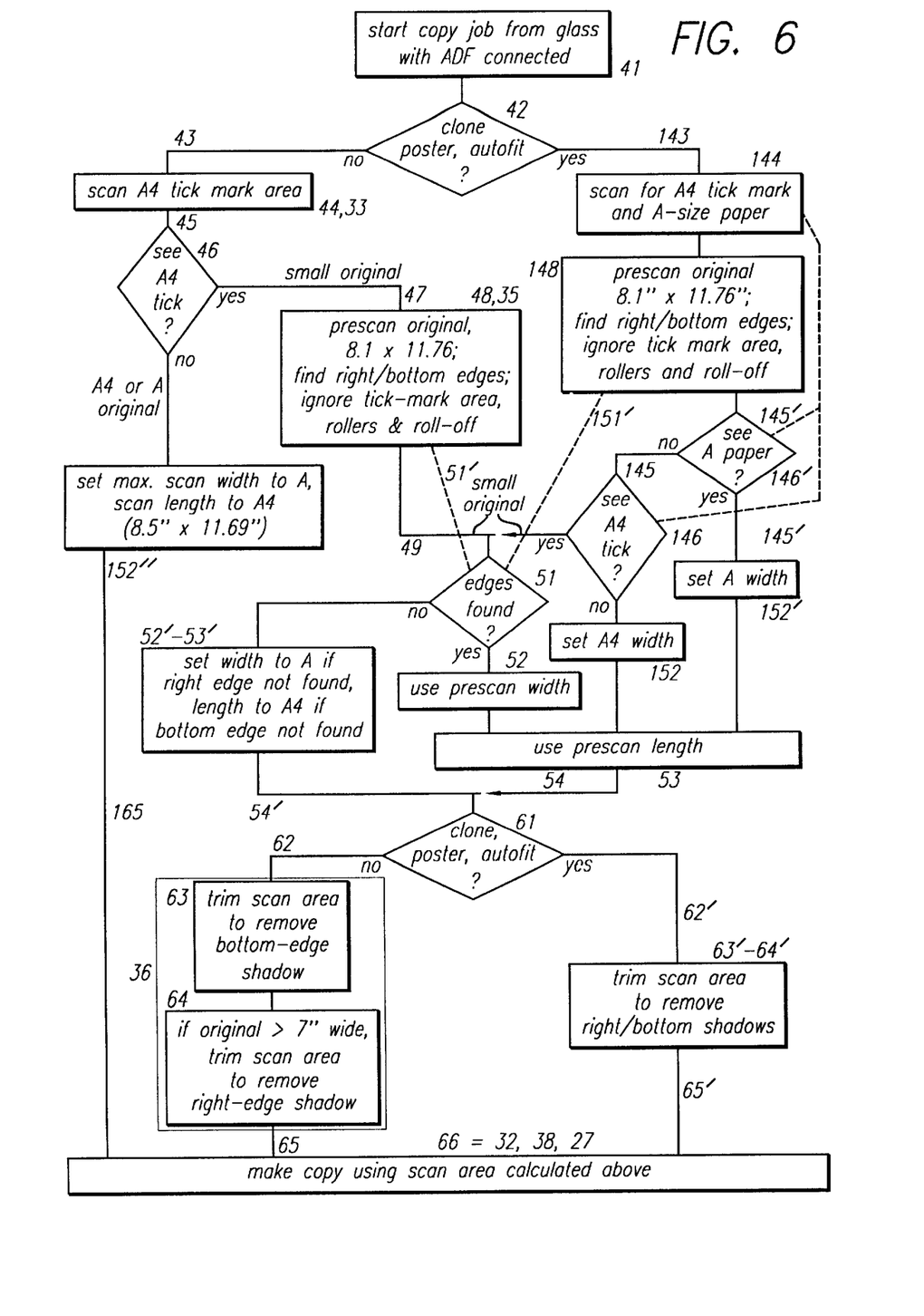
FIG. 6 is a flow chart showing in greater detail the programming of the FIG. 5 embodiment.

The system first tests 42 for operator selection of certain special modes that will be explained shortly; if the operator has not selected any of those modes, the sequencing branches along a path 43 to scan 44 the area of the A4 tick mark 16. That mark is at 20.6 cm (8.1 inches) from the right side of the original. This scan procedure 44 corresponds generally to the previously discussed search module 33 (FIG. 5).

Next the system compares the resulting image data for the tick-mark area with the known shape and position of the tick mark 16. If scanned the area contains a proper image of the tick mark 16, then the mark must not be covered by the document and the system is permitted to conclude that the original document is smaller than A4 size in at least the width direction.

(This conclusion may be incorrect if the document is A4 or larger but is skewed or otherwise mispositioned on the glass. It represents, however, an assumption with which the operator is expected to be familiar, since copies resulting from mispositioned documents are ordinarily unacceptable anyway.)

The small-original case may be considered the situation of greatest interest to the present invention, and so will now be traced through to conclusion. Processing continues along path 47 to a prescanning 48 of most of the visible area, and then analysis of the resulting data in an attempt (not necessarily successful) to locate the right edge and bottom edge.

Because the gradation of brightness in the roll-off area 17 overly complicates interpretation of scan data there, our preferred embodiment does not prescan all the way to 21.6 cm (8½ inches). The prescan and analysis 48 correspond generally to the previously discussed edge-finding submodule 35.

This portion of the procedure employs certain criteria for distinguishing a document image from an image of the backing panel 12. These criteria include the brightness or luminance of pixels, but also take into account the spatial extent of dark-pixel groupings, the proximity of one such grouping to another, etc.

An important tactic in this locating process 48 is that the tick-mark area, and the known positions and shapes of the rollers 13 and roll-off area 17, are disregarded. Except for this tactic, the criteria are set forth in the two above-identified patent documents of James Amidei, wholly incorporated by reference into the present document.

When the edge-finding effort is complete, sequencing proceeds 49 to a decision block 51 where routing depends on auxiliary information 51'—namely, whether edges were in fact found in the effort. If a small document is present, edges are virtually always found; and in this case the system proceeds to use 52 the document-image width found in the prescan 48, and also to use 53 the document-image length found in the prescan 48.

Processing then continues 54 to another decisional block 61 that depends on the possibility of special-mode settings mentioned earlier; and if none of these is in effect then the system takes branch 62 to removal 63 of bottom shadows and possible removal 64 of right-edge shadows. These two removal blocks considered together correspond generally to the earlier-discussed edge-adjustment module 36.

The right-edge shadow is removed only if the original is wider than approximately seventeen centimeters (seven inches). Our philosophy is that trimming of image elements which the CPU classifies as "shadows" is particularly important for intermediate-size documents, since those image elements may actually in part be portions of image data from the rollers 13. We want to be sure that such image data are suppressed when it is likely that they include roller-image data.

Trimming of such image elements for smaller documents, on the other hand, is particularly important near the bottom of the document image where actual shadows arise from the relative positions of sensor array and light source. Trimming of shadow image elements at the right side of small documents, however, is disfavored because in a properly operating system there are no real shadows there—the white backing panel 12 ordinarily is very effective in removing shadows.

Once the system completes any shadow trimming 63, 64 which is to be performed, sequencing continues 65 to using the scan area thus determined, in making 66 a copy. This means that the system makes a final, full scan of the entire area defined—whether large or small—and then applies the data from that scan to printing the copy.

Now we return to trace some of the paths not taken in our foregoing accounting of the main options. In the decisional block 46 that evaluates whether a tick mark was found in the first scan 44, if the system found no image of the tick mark 16, then the mark must be covered by the document and the system is instructed to conclude that the document is A4 size or larger—namely, standard size A4 or A (8½ by 11 inches).

The system responds by bypassing the entire small-original routine, and instead simply setting 152" the scan width and length to accommodate either of the standard sizes, and proceeds to make 66 a copy using these settings. More specifically, the width used is the standard width of a piece of A-size printing medium, namely 8½ inches, and the length used is the standard length of a piece of A4-size printing medium, namely 11.7 inches. This branch is essentially conventional operation of a copying machine.

If instead the tick-mark was found 46 in its area but the system failed to find 48 at least one of the right and bottom edges, then instead of using 51, 52 both width and length found in the prescan 48 the system branches to use 52'-53' of a standard dimension for whichever of the width or length—or both—are missing. In this step the standard dimension used for width is the width of an A sheet, and the standard dimension used for length is the length of an A4 sheet. The system uses (not shown) whichever of the edge positions was actually found and therefore available.

Now in the decisional blocks 42, 61 relating to selection of special modes by an operator, there are three possibilities not covered above. One of these is an "autofit" mode in which an image is automatically enlarged to just fit, in either its length or width, onto a full-size standard sheet of printing medium. Another option is a "poster" mode, in which an image is automatically divided into several portions, each copied as an enlargement onto a full-size standard sheet of printing medium; these sheets can then be mounted together to form a poster-size copy of the original document.

Still another special mode is analogous to the "replicate" mode mentioned above in the background section of this document—multiple actual-size copies of a small original are made on a common single sheet of printing medium. It might be supposed that the suppression of apparatus features in a finished copy may be less important in this case since the several copies most commonly are to be cut apart anyway. To the contrary, however, establishing the document size accurately has the real benefit of enabling the system to fit more copies on a page. It is also desirable, from the standpoint of providing a professional overall result, that apparatus features not be printed next to the array of actual-size copies.

As will be understood from the foregoing, in any of these special modes it is more important than usual to determine the actual size of the printing medium—i.e., whether it is size A4 or A. The system first scans 144 searching for A4-size tick marks, and also to determine whether A-size printing medium is in use.

In our now-preferred embodiment there is no tick mark for A-size medium, and we instead obtain information about A-size by examining luminance information returned by the scanner in its first scan 144. (White paper, for example, returns a characteristic brightness of approximately two hundred counts out of two hundred fifty-five for maximum sensor response.) The right edge of properly positioned A-size printing medium extends to a position 14 (FIG. 2) very nearly halfway out the dark-appearing but gradated (FIG. 3) roll-off area 17—and the printing medium is ordinarily uniform in brightness. Therefore the right edge of the printing medium ordinarily stands out very well against the roll-off. This system of course can be deceived if the printing-medium stock too is precolored with some gradation of brightness in the same area, but that is an extraordinary case.

Next the system performs a prescan 148 that is closely similar to the prescan 47 in the routine 43–64 discussed earlier for small originals, attempting to locate right and bottom edges while ignoring the tick mark area, rollers and roll-off. Next is a cascaded set of decisional blocks 146', 146, 51 for evaluating whether the paper is size A (in which case the system sets 152' final-scan width to A size), or is size A4 (in which case the system sets scan width to A4).

The first two of these blocks are based on information 145', 145" from the scan 144 for the A4 tick mark scan and A-size paper. If neither of these standard paper sizes is found, the third decisional block 51 proceeds based on information 151' from prescan 148—namely, whether edges were found. This last block will be recognized as the same procedure used in the small-original routine 43–64.

If the system width is given a prescan setting 52, A4 setting 152, or A setting 152', and if a prescan length was established, then as before the system selects 53 that prescan length. Otherwise it uses 52'–53' A4 length. Similarly if no width could be established from the tick/A scan 144, the system selects an A setting 52'–53'.

Next if one of the three special modes is in use, at the decisional block 61 branches 62' to trim 63'–64' the scan area for removal of right and bottom shadows. In these modes our earlier-described philosophy of applying a 17 cm threshold for right-edge shadow removal 64 is at least less applicable.

The use of indicia in our preferred embodiments is not an absolute requirement, since the system could instead search for images of the rollers themselves, or the roll-off area itself. Use of indicia, however, typically speeds up normal copying—as the apparatus otherwise would have to scan about one-third of the way down the page.

Moreover the indicia are advantageously placed slightly further outboard than the rollers, providing a small additional margin (literally) for error in comparison with detecting the rollers themselves. That is to say, if the printing medium is covering the indicia then it surely must be covering the rollers; as mentioned elsewhere in this document, however, this strategy does leave some room for error if the print medium is skewed on the glass or is an irregular shape.

In the described embodiment we use no tick marks or other indicia for automatically finding the length of the printing medium. Length is relatively easy to establish from luminance criteria.

Our invention could be made somewhat more effective in discriminating between A and A4 sheets if an additional set of tick marks were available on the underside of the feeder, between the A edge 14 and the A4 edge 15—and not in the roll-off area 17. Darkness in the roll-off area, combined with the receding (i.e., out-of-focus) character of the surface, makes location of tick marks on that surface inadequately reliable.

Such additional tick marks would require moving the roll-off area further out, and this in turn would call for an added six millimeters (quarter inch) in feeder width. Unfortunately that additional width, in the present embodiment, would undesirably expand the entire product envelope.

Figure 7:
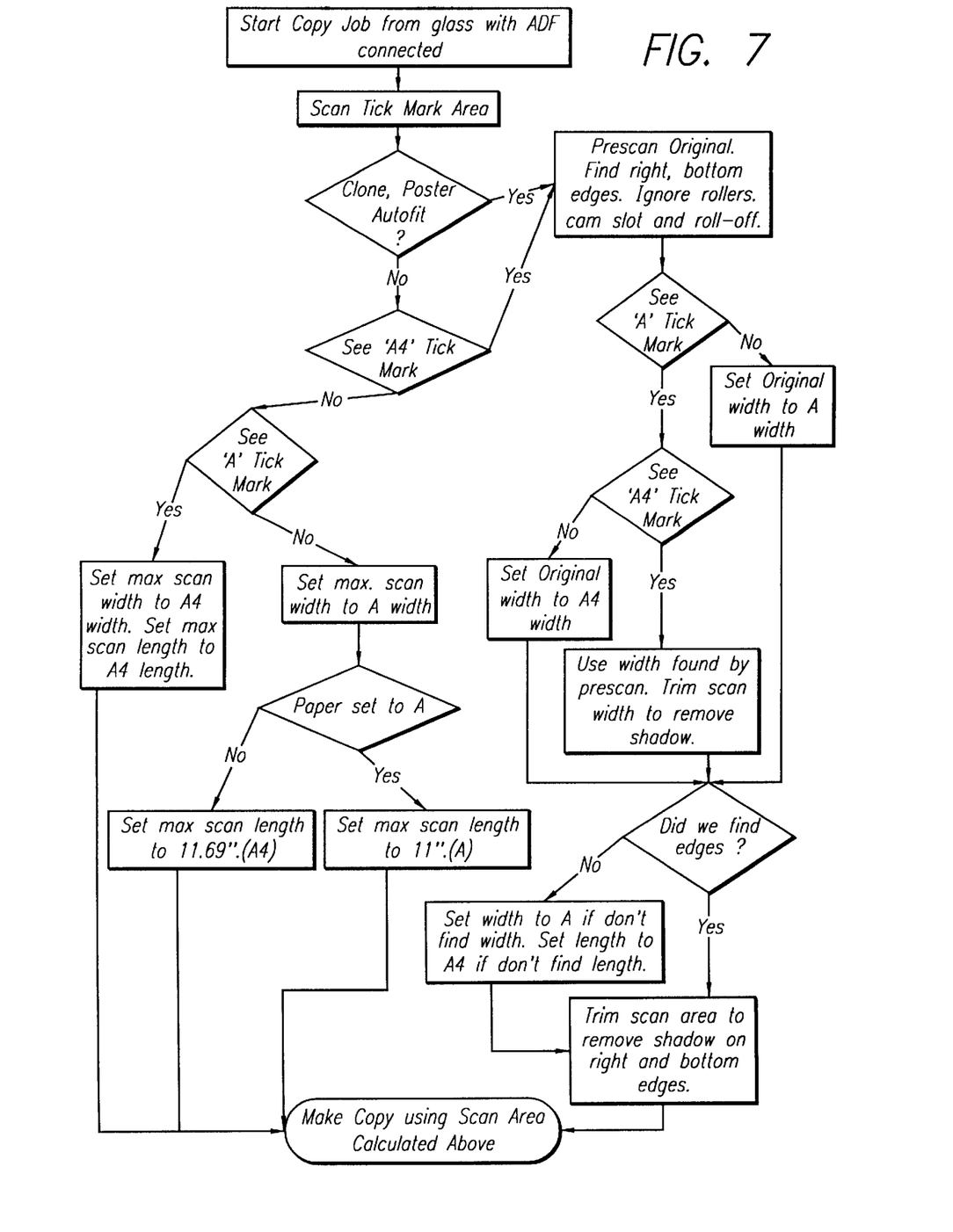
FIG. 7 is a flow chart showing a variant of the programming.

In a different embodiment having slightly greater space, A-size tick marks could be placed in the border zone between the expected A edge position 14 and A4 edge position 15. To exploit the additional available information, the FIG. 6 programming could be modified in such a system as suggested in the FIG. 7 variant. Given the foregoing detailed description of FIG. 6, those skilled in the art will be able to follow FIG. 7 without further discussion.

Our invention encompasses still another embodiment that identifies the roll-off area by its characteristic luminance curve. The apparatus is readily programmed to compare a prescanned luminance distribution with that known characteristic for the roll-off, and thereby determine whether the roll-off is in view or is being obscured by a piece of printing medium—and thus the size of the printing medium that is in place.

Our invention, barring recognition difficulties, does not copy data that extend beyond the original placed on the glass. Even if the user places an original on the glass that covers part of the rollers, the copy will not print any data that is larger than the original. So, the rollers, and roll-off are not printed onto the user's copy or onto the print pivot 29.

There are a few drawbacks and scenarios that our invention does not solve: The first page out of the copier takes 1½ seconds longer to complete; that is a one-time delay, which may be regarded as amortized over all copies if the operator sets the machine to make two or more copies. This is due to the need to scan 44, 144 the "tick" mark.

All copies of originals that do not cover the "tick" mark are delayed by an additional eight seconds due to the need for the prescan 48, 148. Therefore, when a user places a small photo onto the glass and instructs the machine to copy it, the task takes up to eight seconds longer—for both black-and-white and color copies.

If the original covers the "tick" mark but doesn't cover the rollers, or the roll-off, the uncovered features are printed. This case of course ordinarily represents a mispositioning of the document: badly skewed on the glass, or placed at the rear edge of the copier glass 2 rather than at the forward corner 18' next to the control panel 7. It may also represent an irregularly shaped (nonrectangular) document. Such problems tend to occur more often with reductions below 91%. However, they can arise at 100% if the original is smaller than the selected printing-medium size.

If the original is a transparency, the rollers, etc. may show through the original. In this case, the system will most commonly see the original as a small document and will suppress the rollers and other features—and with them, usually, portions of the original image itself. Our invention cannot resolve this problem because visually, even optically, the apparatus-feature image is literally merged with the original-document image. The user, however, can eliminate this effect by placing a white sheet of paper on top of the transparency (and thereby physically separating the two sets of image elements).

The above disclosure is intended as merely exemplary, and not to limit the scope of the invention—which is to be determined by reference to the appended claims.

What is claimed is:

1. Apparatus for copying a document; said apparatus comprising:
    means for copying things that are within a defined field of view;
    visible apparatus features within the field of view; and
    automatic means for suppressing copying of the visible apparatus features if they are not covered by such document; and wherein:
        the copying means comprise means for acquiring an image of things within the field of view; and
        the suppressing means comprise means for searching the image for certain of the visible apparatus features.
2. The apparatus of claim 1, wherein:
    said certain of the features comprise document-size indicia carried on the apparatus.
3. The apparatus of claim 1, wherein:
    the suppressing means further comprise means for suppressing copying of all the visible apparatus features if said certain of the features is found.
4. Apparatus for copying a document; said apparatus comprising:
    means for copying things that are within a defined field of view;
    visible apparatus features within the field of view; and
    automatic means for suppressing copying of the visible apparatus features if they are not covered by such document; and wherein:
        the suppressing means comprise means for preventing copying of shadow images formed at edges of such document; and the shadow-image-preventing means comprise:
            means for finding document-image edges; and
            means for copying material sufficiently within the document-image edges to avoid copying shadow images.
5. The apparatus of claim 4, wherein:
    the means for finding document-image edges comprise means for ignoring all visible apparatus features within the field of view.
6. The apparatus of claim 5, wherein:
    the visible apparatus features comprise document-size indicia; and
    the feature-ignoring means operate substantially only if such document does not cover all document-size indicia.

7. A machine for copying a document; said machine comprising:
    photosensors for acquiring image data from such document;
    means for printing an image based on the data;
    a document feeder for positioning such document at the photosensors;
    means for automatically analyzing the data to determine whether such document is smaller than a standard size; and
    means, responsive to the analyzing means, for automatically controlling the printing means to suppress printing portions of the data;
    wherein the analyzing and controlling means operate whenever the document feeder is attached to the copying machine but not in service.
8. The apparatus of claim 7, wherein:
    the document feeder carries document-size indicia; and
    the analyzing means comprise means for comparing portions of the data with the document-size indicia.
9. The apparatus of claim 8, wherein:
    the controlling means suppress printing visible features of the document feeder, including but not limited to the document-size indicia, if the comparing means find data corresponding to the document-size indicia.
10. The apparatus of claim 9, wherein the controlling means further comprise:
    means for locating edges of such document; and
    means for suppressing printing portions of the data beyond said edges.
11. The apparatus of claim 10, wherein:
    the controlling means further comprise means for suppressing printing of shadows along said edges.
12. A method of copying a document, using a copying machine that has a document feeder in operating position but not in service; said method comprising the steps of:
    automatically acquiring image data with the document in copying position;
    automatically analyzing the data to determine whether the document is smaller than a standard size;
    responsive to the analyzing step, automatically suppressing portions of the data whenever the document feeder is substantially in operating position but not in service, if the analyzing step indicates that the document is smaller than a standard size; and
    automatically printing unsuppressed portions of the data.
13. The method of claim 12, wherein:
    the acquiring step comprises operating a scanner portion of the copying machine to acquire specific image data of a part of the document feeder that has indicia for distinguishing between presence and absence of at least one standard size of printing medium; and
    the analyzing step comprises searching the specific image data for an image of the indicia.
14. The method of claim 13, comprising the further steps of:
    if the analyzing step indicates that the document is smaller than a standard size, then automatically acquiring further image data with the document still in copying position; and
    automatically analyzing the further image data to find edges of the document.

15. The method of claim 14, wherein:
the further-data analyzing step comprises ignoring data corresponding to the image of the indicia.

16. The method of claim 15, wherein:
the further-data analyzing step further comprises ignoring data corresponding to images of known apparatus features of the document feeder.

17. The method of claim 13, comprising the further steps of:
if the analyzing step indicates that the document is smaller than a standard size, then automatically acquiring further image data with the document still in copying position; and
automatically analyzing the further image data to find edges of the document.

18. The method of claim 13, wherein:
the acquiring step comprises operating a scanner portion of the copying machine to acquire specific image data corresponding to a part of the document feeder that appears dark if not concealed, to distinguish between presence and absence of at least one standard size of printing medium; and
the analyzing step comprises determining the brightness represented by the specific image data.

19. A copier having a transparent surface for supporting from below within a defined field of view scanning area, a document to be scanned and copied and an automatic document feeder disposed above the transparent surface and having apparatus features visible within the defined field of view scanning area for facilitating the moving of the document to be copied into the field of view area, the document to be copied having a sufficient area size to block the viewing of the apparatus features during a document scanning period of time, comprising:
a detection arrangement for automatically detecting the presence of a small document within the defined field of view scanning area, said small document not having a sufficient area size to block the viewing of the apparatus features during the document scanning period of time; and
a suppression arrangement responsive to said document detection arrangement for suppressing the scanning of the unblock apparatus features during the document scanning period of time so the unblock apparatus features are not copied.

20. A copier according to claim 19, wherein said detection arrangement includes:
an indicia detection arrangement for detecting indicia carried by the automatic document feeder; and
wherein said suppression means permits the scanning of the entire field of view area in the absence of said indicia detection arrangement detecting the indicia carried by the automatic document feeder.

21. A method of copying a document, comprising:
automatically detecting the presence of a small document within a defined field of view scanning area, said small document not having a sufficient area size to block the viewing of apparatus features visible within said area during a document scanning period of time; and
suppressing the scanning of the visible apparatus features with said area during the document scanning period of time so the visible apparatus features are not copied.

22. A system for copying a document, comprising:
means for automatically detecting the presence of a small document within a defined field of view scanning area, said small document not having a sufficient area size to block the viewing of apparatus features visible within said area during a document scanning period of time; and
means responsive to said detecting means for suppressing signals indicative of the visible apparatus features detected within said area and for copying only said small document.

* * * * *